Feb. 13, 1962

S. A. RASCATI 3,021,499

BUSWAY PLUG UNITS

Filed July 21, 1959

INVENTOR.
SALVATORE A. RASCATI
BY Robert F. Casey
ATTORNEY

Feb. 13, 1962  S. A. RASCATI  3,021,499
BUSWAY PLUG UNITS

Filed July 21, 1959  3 Sheets-Sheet 2

INVENTOR.
SALVATORE A. RASCATI
BY Robert A. Casey
ATTORNEY

Feb. 13, 1962 S. A. RASCATI 3,021,499
BUSWAY PLUG UNITS

Filed July 21, 1959 3 Sheets-Sheet 3

INVENTOR.
SALVATORE A. RASCATI
BY
Robert A. Casey
ATTORNEY

United States Patent Office 3,021,499
Patented Feb. 13, 1962

3,021,499
BUSWAY PLUG UNITS
Salvatore A. Rascati, Wallingford, Conn., assignor to General Electric Company, a corporation of New York
Filed July 21, 1959, Ser. No. 828,535
7 Claims. (Cl. 339—22)

This invention relates to electric power distribution systems of the bus bar type, and more particularly it relates to plug-in type power take-off devices or plugs for electric power busways.

Bus bar distribution systems, commonly referred to as busways, are used for the safe and efficient distribution of polyphase electric power in industrial plants, office buildings and the like. In essence a busway comprises a plurality of elongated electrical conductors or bus bars connected for energization to the respective phases of a polyphase electric power source and enclosed in a grounded metal unit or housing. The bus bars are supported in side-by-side, spaced-apart relation within the metal housing, and suitable insulation is provided to ensure that each phase is electrically isolated from the other phases and from ground.

Plug-in type busways are busways having provisions at spaced intervals for the convenient connection of removable enclosures or units enclosing power tap-off devices such as safety switches, circuit breakers, fuses or the like providing a controlled supply of electric power to individual utilization circuits. Each plug-in unit is removably mounted at an appropriate location on the busway housing, and the circuit controlling device enclosed therein is connected to the electric power source by means of suitable plug-in type disconnect contacts disposed to engage cooperating uninsulated portions of the respective bus bars. Such units are known as busway plugs.

In order to obtain desirable flexibility and convenience, plug-in type busways conventionally are each arranged for quick and easy mounting and dismounting of a number of different busway plug units. Since many different designs of busways and many kinds of busway plugs must be made commercially available to satisfy the widely varying requisites encountered in the art of electric power distribution, realization of the desired degree of flexibility and interchangeability could easily involve furnishing an inordinate variety of busway plug models, with correspondingly high manufacturing and inventory costs. Accordingly, it has been proposed to equip a relatively small line of standard or basic plugs with detachable base members which carry specially designed contact assemblies for connecting the circuit controlling means of the plug unit to the bus bars in various busways. By providing an appropriate variety of these easily detached and replaced base members individually tailored to the respective busway designs, each species of plug can be quickly and economically adapted for use in connection with many different busways. Such an arrangement is fully disclosed and claimed in a copending patent application Serial No. 775,648, John W. Meacham and Cecil B. Turton, filed on November 21, 1958, now Patent No. 2,938,971, issued May 31, 1960, and assigned to the same assignee as the present invention.

As is described in detail in the aforesaid copending patent application, the contact assembly of the proposed detachable base member is arranged for convenient plug-in connections at both ends, i.e., at the end contacting the bus bars and also at the opposite end which is connected to the circuit controlling means in the plug unit. The latter connection is disclosed as comprising finger-like contact elements or "stabs" and cooperating contact jaws or clips which resiliently yield and are spread apart by insertion of the stabs therein. When connecting relatively high-current capacity circuit controlling devices to the contact assembly of the detachable base member, I have found that this plug-in action is not entirely satisfactory. For current ratings of 800 amperes, for example, it has proven difficult to obtain sufficient contact pressure at the plug-in junction for keeping the temperature rise within permissible limits while at the same time ensuring that not more than a reasonable amount of manual force is required to make the plug-in connection.

Accordingly, it is a general object of my invention to provide an improved busway plug unit including a detachable base member carrying a contact assembly which can be conveniently yet positively and forcibly connected to circuit controlling means enclosed in the unit.

Another object of the invention is the provision of a busway plug unit including a detachable, interchangeable base member having a contact assembly connected to the circuit controlling means within the unit by a conveniently disconnectable high-pressure electric joint which will not lose appreciable contact pressure even after being repeatedly disconnected and reconnected.

Still another object is the provision of an enclosed busway plug unit with improved arrangements for reducing heat generation and for enhancing heat dissipation.

In carrying out my invention in one form, I provide a sheet metal enclosure or body enclosing circuit controlling means to which a plurality of electric conductors are connected. The conductors are respectively provided with flat contact areas disposed in parallel spaced-apart relationship within the body. A base member is detachably mounted on the body and supports a plurality of spaced conducting elements having external ends disposed outside the body for plug-in connections to bus bars of a busway. Internal ends of the conducting elements are located inside the body and are respectively provided with flat contact areas disposed in overlapping electrically contacting engagement with the contact areas of the aforesaid conductors, respectively. I provide clamping means supported by the body in cooperation with said conductors for deflecting the conductors in a manner to establish firm contacting pressures between the engaging areas of the respective conductors and conducting elements, the contacting pressures at all of the engaging areas being effected by a single force-applying means which in one aspect of my invention is operable from outside the sheet metal body. Thus a compact "clamp-in" electric junction is formed for conveniently connecting and disconnecting the conducting elements carried by the detachable base member and the conductors associated with the circuit controlling means within the busway plug unit.

In accordance with another aspect of the invention, the conductors in the sheet metal body comprise bars of rectangular cross section, and at least two bars are connected to each phase of the circuit controlling means. These bars extend in spaced-apart generally flatwise relationship from the circuit controlling means to a terminal region where they are disposed in parallel alignment for connection to the conducting elements of the base member.

In accordance with another aspect of the invention, I provide a novel contact adapted assembly for use with a busway plug, having a number of double-ended contact stabs, one end of each being arranged to be plugged into a hollow bus bar, the other ends of the stabs being adapted to be clamped together into contact with respective contacts in the plug body. To facilitate this, the contact stab elements are made to have their end portions transversely movable by supporting the stabs by a flexible supporting means, at an intermediate point, on a common insulating base or support.

My invention will be better understood and its various objects and advantages will be more fully appreciated from the following description taken in conjunction with the accompanying drawings in which.

Figure 1:
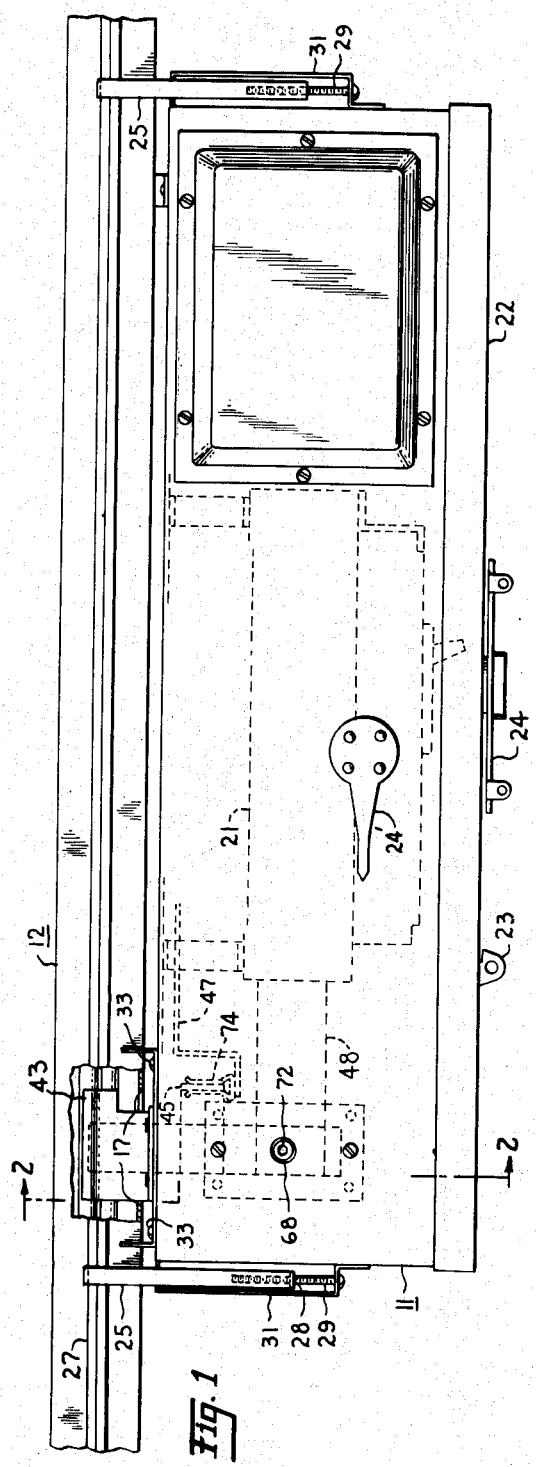
FIG. 1 is a side elevation of a busway plug unit shown in mounted position on a busway housing, a portion of the busway housing being broken away.
Figure 2:
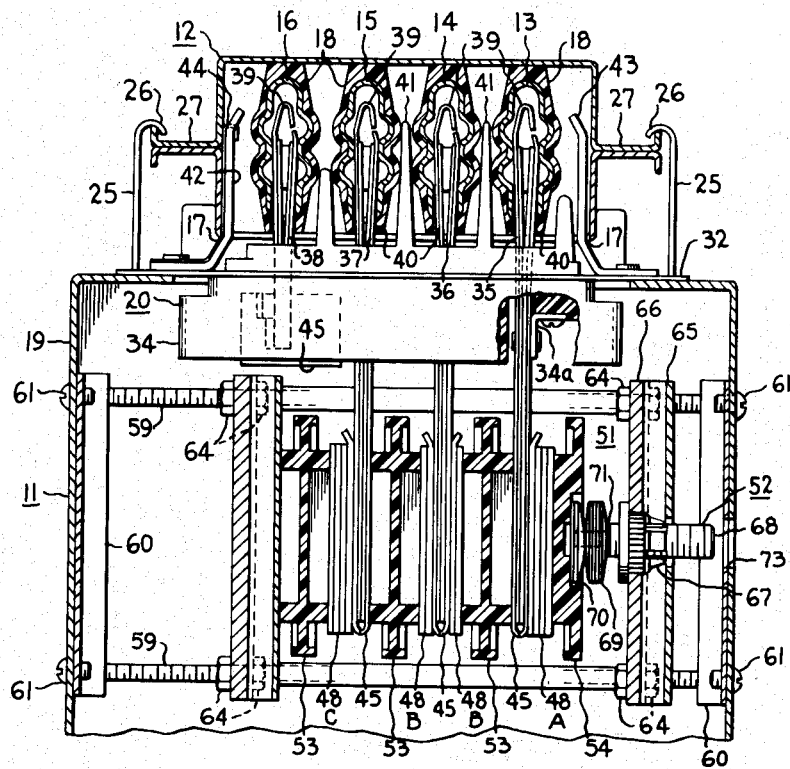
FIG. 2 is a sectional view taken along line 2—2 of FIG. 1.

Referring now to FIGS. 1 and 2, the busway plug unit 11 is shown removably mounted on a sheet metal busway housing or unit 12, housing four elongated, parallel bus bars 13—16. The housing 12 comprises a section of a typical plug-in type busway, and in order to accommodate various kinds of tap-off devices, an aperture 17 is provided in the housing for limited access to the bus bars supported therein. The bus bars 13—16 are part of an electric power distribution system including a 3-phase 4-wire alternating current source (not shown) to which the bus bars are connected for energization. The bus bars are individually sheathed by suitable electric insulation 18, and in the preferred embodiment of my invention each bar is generally tubular in form with an oblong cross section as indicated clearly in FIG. 2.

The busway plug unit 11 comprises a separate sheet metal box-like enclosure or body 19 and a detachable contact base assembly 20. Suitable circuit controlling means, such as the 3-pole molded case circuit breaker 21 illustrated in FIG. 3 by way of example, is mounted in the enclosure 19. A hinged cover 22 releasably latched at 23 permits access to the interior of the plug body 19, and a pivotally mounted operating handle 24 is carried by the cover 22, or alternatively at 24′ on the side of the enclosure, for opening and closing the circuit breaker from outside the unit. See FIGS. 1 and 3.

Figure 3:
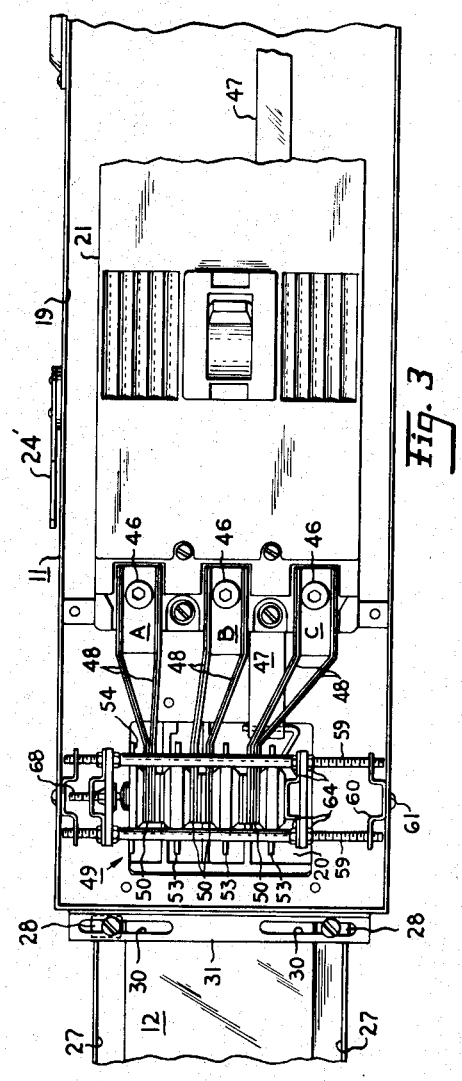
FIG. 3 is a partial plan view of the front of the busway plug unit of FIG. 1, the unit cover being removed.

The removable plug unit 11 is mounted on the busway housing 12 by means of two pairs of elongated hanger members 25 each having a hook-like end 26 for engaging a flange portion 27 of the housing 12, as is best seen in FIG. 2. The opposite end 28 of each hanger member is bent over and tapped for receiving a cooperating bolt 29. As is shown in FIGS. 1 and 3, each bolt 29 extends through an appropriate slot 30 in brackets 31 which are affixed to opposite ends of the sheet metal enclosure 19. The bolt heads are too large to pass through the slots 30, and by tightening the bolts into the threaded ends 28 of hanger members 25, the busway plug unit 11 is firmly, but removably, attached to the busway housing 12.

Figure 4:
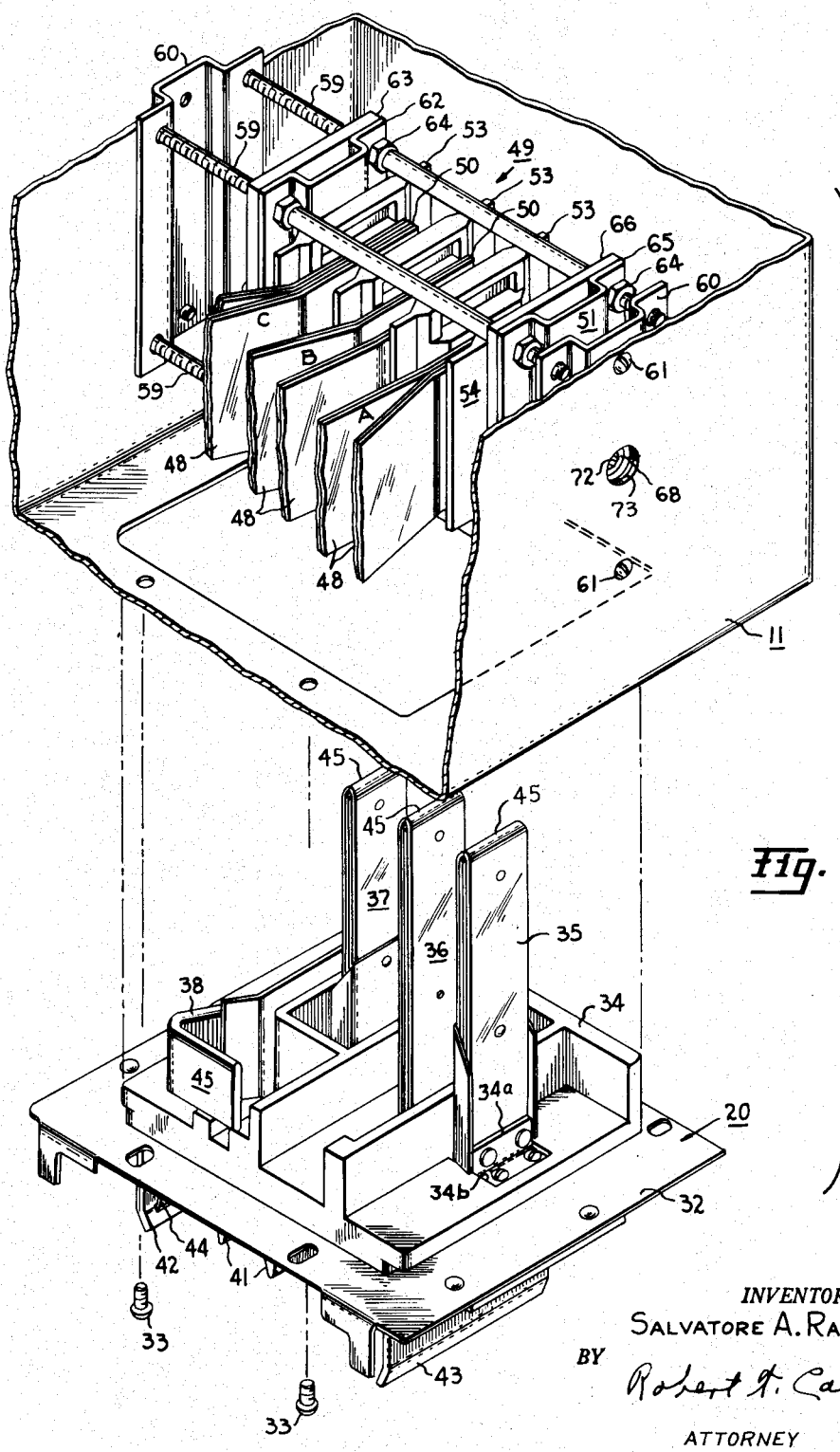
FIG. 4 is an exploded perspective view of a portion of the busway plug unit shown in FIGS. 1–3, showing particularly the detachable contact base and clamping means therefor.

The contact base assembly 20 of the plug unit 11 includes a metal frame or supporting plate 32 which is detachably mounted on the rear wall of the plug body or enclosure 19 by suitable means such as bolts 33, as is shown in FIG. 4. Affixed to the frame 32, as can be seen in FIGS. 2 and 4, is a base 34 of insulating material which supports four spaced conducting elements or contacts 35—38 of electroconductive material such as copper.

Each of the contact elements 35, 36, and 37 comprises a single, continuous, double-ended stab contact member, which is supported at an intermediate portion thereof by flexible supporting means comprising a generally L-shaped supporting bracket 34a. The apertures 34b, in the insulating base 34, through which each of the contact elements project, is made to provide a substantial clearance for the corresponding contact element. By reason of this construction, the contact elements may alter their position with respect to the base 34 as the inner ends thereof are clamped together in a manner to be described. In addition, this construction avoids placing any high stresses on the insulating base 34 such as might cause it to crack.

As is best seen in FIGS. 1 and 2, the conducting elements 35—38 of the base member 20 extend from within to without the busway plug unit 11. The external ends 39 of these elements enter the busway housing 12 through aperture 17 and are adapted for plug-in connections to the respective bus bars 13—16. For this purpose each of the bus bars 13—16 is slotted at 40, and an appropriate portion of the insulating sheath 18 is removed over each slot 40. Stab-like contacts formed at the external ends 39 of the conducting elements 35—38 enter the respective slots 40 and engage the inner walls of the tubular bus bars 13—16. Appropriate insulating barriers 41 on the base member 20 also project through the aperture 17 into the busway housing 12 and are disposed alongside the bus bars 13—16 to aid in electrically isolating the different phases.

For the purpose of guiding the external ends 39 of the conducting elements 35—38 into proper engagement with the bus bars 13—16, and for protecting these elements from damage when the plug unit 11 is being shipped and handled, a pair of side barriers 42 and 43 (shown in FIGS. 1, 2 and 4) are carried by the supporting plate 32 of the base member 20. Each of the barriers 42 and 43 comprises an angular piece of sheet metal having a coating of insulating material firmly bonded to the outside surfaces thereof. The barrier 42 in addition has a metallic grounding strip 44. When the plug unit 11 is being mounted on the busway housing 12, the barriers 42 and 43 enter the aperture 17 at opposite ends thereof and slide along the inner surfaces of the sidewalls of the busway housing thereby determining the course of movement of the unit 11. If desired, one of the barriers 42 or 43 can be slidably mounted on 32 and suitably coupled to the operating mechanism of the circuit breaker 21 enclosed in unit 11 for providing an interlocking action in accordance with the teachings of a copending patent application Serial No. 759,353, Cecil B. Turton, filed on September 5, 1958, and assigned to the same assignee as the present invention.

The conducting elements 35—38 of the detachable base member 20 have internal blade-like ends 45 located inside of the plug unit 11. The internal ends of elements 35—37 are arranged to be respectively connected to the line terminals 46 of the 3-pole circuit breaker 21, while the internal end of element 38 is connected to a ground or neutral strap 47 disposed within the enclosure 19. The load terminals (not shown) of the breaker and a suitable terminal (not shown) at the remote end of the strap 47 are adapted to be connected to flexible cables or the like comprising a 4-wire polyphase utilization circuit being supplied by the busway plug unit 11.

In accordance with the afore-mentioned patent of Meacham and Turton, the electrical connections between the contact assembly (35—38) of the detachable base member 20 and the circuit controlling means 21 within the plug body 19 is of a plug-in type, whereby the interchangeable base member shown can easily and quickly be detached and replaced by a different base member. The purpose of this arrangement, as stated hereinbefore, is to enable each basic or standard plug body to be conveniently adapted to fit a plurality of different busway designs merely by selecting the appropriate one of a variety of available base members. Since the cost of producing and stocking a wide variety of interchangeable base members is considerably less than the expense of making available a correspondingly wide variety of plug bodies, a desirable degree of flexibility and interchangeability is economically realized.

In accordance with the present invention, the electrical connection between the contact assembly of the detachable base member and the circuit controlling means enclosed in the busway plug body is accomplished by a compact clamp-in arrangement that provides both unusually high contact pressure and very convenient connectibility. Toward this end, a plurality of electric conductors 48, preferably in the form of copper bars having rectangular cross sections, are located within the enclosure 19 for connection to the circuit breaker 21. The bars are arranged in three phases or groups A, B and C of four bars each, and these groups are respectively connected to the breaker line terminals 46 of different phases. As is most clearly shown in FIG. 3, the electric conductors or bars 48 extend in spaced-apart generally flatwise relationship from the circuit breaker 21 to a terminal region 49 wherein they are aligned in side-by-side parallel relationship. The spacings provided between adjacent conductors enables circulating air to flow across all surfaces thereby aiding heat dissipation.

As is best seen in FIGS. 3 and 4, each of the conductors 48 has a free end 50 terminating in the terminal region 49. The free ends of the four conductors comprising each of the groups A and C adjoin one another, while the free ends of the four conductors comprising group B are paired as shown. All of the conductors 48 are sufficiently resilient to permit a small amount of lateral movement at their respective free end portions 50.

Interleaved among the free ends 50 are the internal ends 45 of the conducting elements 35—37 supported by the detachable base member 20. The internal ends or blades 45 have rectangular cross sections, and each has a flat area disposed in overlapping electrically contacting engagement with a corresponding flat area of the free end of a different conductor 48. In this manner the internal ends 45 of the respective conducting elements 35—37 are electrically connected to free ends 50 of correspondingly phased conductors 48. See FIGS. 2 and 4.

In order to establish firm contacting pressures at the several areas of engagement between the respective conducting elements 35—37 and conductors 48, clamping means 51 is provided in the enclosure 19 for laterally deflecting the free ends 50 of conductors 48 toward the associated internal ends 45 of elements 35—37. The clamping means also establishes firm contacting pressures between adjoining sides of the free ends 50 associated with common phases, whereby a good electrical interconnection is formed at the free ends of the four parallel conductors 48 comprising each group or phase A, B and C.

For convenient connectibility, the clamping means 51 includes a single force-applying means 52 operable to apply and to release the contacting pressures at all of the engaging areas and sides mentioned above. With the contacting pressures released, the internal ends 45 projecting from the detachable base member 20 can be freely and easily withdrawn from or inserted among the free ends 50 in the enclosure 19, and consequently the base member can be readily detached or assembled. With the contacting pressures applied, firm electrical joints of relatively low resistance are formed for conducting polyphase current of relatively high magnitudes with minimum heat generation and power loss.

The clamping means 51 employed for electrically interconnecting the conducting elements of the detachable base member 20 and the conductors associated with the circuit controlling means 21 enclosed in the plug unit 11 is preferably similar in construction and operation to that described and claimed in a copending patent application Serial No. 737,934 Johnston et al., filed on May 26, 1958, now Patent No. 3,004,097, issued October 10, 1961, and assigned to the same assignee as the present invention. This clamping means comprises a stack of individual insulators 53 and 54 which, as shown in section in FIG. 2, are sandwiched among the free and internal ends 50 and 45 for physically joining and electrically separating the different electric phases with respect to each other and with respect to the metal structure of the clamping means. Thus, the various cooperating components comprising the electric joint under consideration are disposed in the following order, proceeding from one end of the stack of insulators to the other: an insulator 53, the free ends 50 of the four conductors 48 comprising phase C, the internal end 45 of the correspondingly phased conducting element 37, another insulator 53, the free ends of one pair of conductors 48 comprising phase B, the internal end 45 of the conducting element 36, the free ends 50 of the other pair of conductors 48 of phase B, another insulator 53, the internal end 45 of the conducting element 35, the free ends 50 of the correspondingly phased conductors 48 comprising phase A, and the insulator 54.

Figure 5:
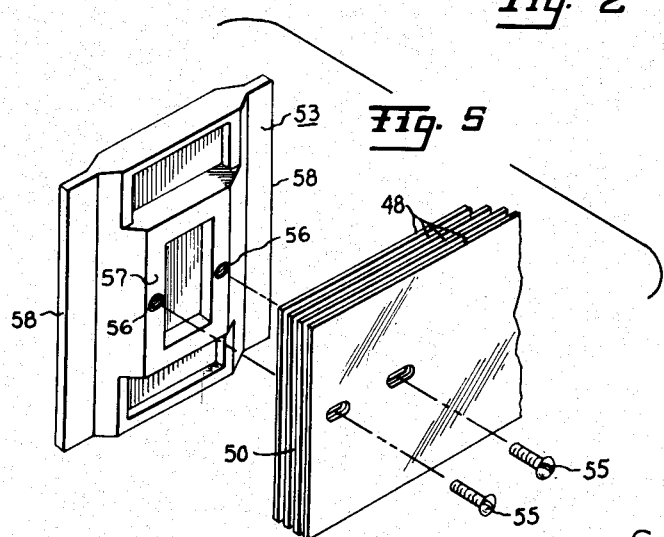
FIG. 5 is an exploded perspective view of a portion of clamping means of FIG. 4.

The construction of the insulators 53 can be seen most clearly in FIG. 5. As indicated there, the insulators 53 are fixedly attached to the respectively adjoining free ends 50 of conductors 48 by means of screws 55 which enter into threaded metallic inserts 56 in the insulators. Each insulator is a solid block of molded insulating material having a centrally located, generally square spacing portion or rib 57 raised on opposite sides and relatively thin peripheral portions or flanges 58 extending outwardly therefrom. The spacing portions 57 on opposite sides of the insulators 53 are designed for successfully withstanding compression of at least 5,000 pounds. The insulator 54 is essentially the same as insulators 53 with the exception of the omission of the spacing portion or rib 57 on one side.

Returning now to FIGS. 2–4, it can be observed that the clamping means 51 includes four tension members 59 traversing all of the insulators 53 and 54. These members, which preferably are metallic tie rods, are supported at opposite ends by suitable brackets 60 affixed by means of screws 61 to the sidewalls of the sheet metal enclosure 19. The tie rods 59 are arranged in two pairs with the stack of insulators 53, 54 located therebetween, as shown. The insulator 53 at one end of the stack abuts a channel member 62 which together with a solid plate 63 is rigidly fastened to the tie rods 58 by means of nuts 64 threaded thereon.

The force-applying means 52 of the clamping means is disposed adjacent the insulator 54 at the other end of the stack of insulators 53, 54. The force-applying means includes another channel member and plate 65 and 66, respectively, rigidly fastened to the tie rods 59 by nuts 64. The plate 66 has an opening through which the neck of a suitable lock nut 67 extends, and the lock nut is rigidly attached to the plate. A force-applying set screw or bolt 68 is disposed in the lock nut 67.

One end of the bolt 68 is located adjacent the insulator 54 and is terminated by a set of spring members 69 of the "Belleville" washer type. Each spring member 69 comprises a dish-shaped washer of resilient metal such as spring steel. The washers are nested in pairs, and preferably three pairs are arranged as best seen in FIG. 2. By turning the bolt 68 into the lock nut 67, the washers are compressed between the bottom of a shallow recess 70 provided in the otherwise flat side of insulator 54 and a shoulder 71 of the bolt 68. The head of the bolt 68 has a hexagonal socket 72 to receive a correspondingly shaped wrench (not shown) for turning the bolt, and an appropriate aperture 73 is provided in a sidewall of the enclosure 19 so that the operating wrench can be inserted from outside the enclosure into the socket 72.

Because the lock nut 67 is captured by the plate 66, the act of advancing the bolt 68 into nut 67 forces the end insulator 54 to move relative to the tie rods 59. The other end insulator 53 as noted above, abuts the channel member 62, which is secured to the tie rods 59 and cannot move. Consequently, this operation of the force-applying means 52 stresses the tie rods 59 and compresses the stack of insulators 53, 54 thereby deflecting the free ends 50 of the conductors 48 to effect firm contacting presures at the various areas of engagement between the respective internal ends 45 and free ends 50, as well as between adjoining sides of the free ends 50 associated with common phases. The force-applying means 52 is operable to exert the desired high-contacting pressures even after interchangeable base members have been disconnected and reconnected many times.

Since the firm and positive contacting pressures obtainable by the arrangement described hereinbefore are not ordinarily necessary in the neutral or ground circuit, a conventional resilient contact jaw or clip 74 is provided for engaging the internal end 45 of the conducting element 38 of the detachable base member 20. (See FIG. 1.) The clip 74 is connected to the ground or neutral strap 47 located in the busway plug enclosure 19 and cooperates with the conducting element 38 to make and break the neutral circuit as the detachable base member 20 is mounted and dismounted, respectively.

While the invention has been shown only in a particular embodiment, it will be readily appreciated that many modifications thereof may readily be made by those skilled in the art. It is therefore intended by the appended claims to cover all such modifications as fall within the true spirit and scope of the invention.

What I claim as new and desire to secure by Letters Patent of the United States is:

1. A busway plug unit comprising: a sheet metal enclosure; a plurality of electric conductors within the enclosure, each of said conductors having a flat contact area disposed in parallel spaced relation with respect to flat contact areas of the other conductors; all of the contact areas being in substantial alignment in a row; a base member detachably mounted on the enclosure, said base member including a plurality of spaced conducting elements extending from within to without the enclosure, said conducting elements having external ends disposed outside the enclosure for plug-in connections to bus bars of a busway and having internal ends located inside the enclosure, each of said internal ends having a flat contact area disposed in overlapping electrically contacting engagement with the flat area of a different one of said conductors to provide a row of overlapped pairs of contact areas; and clamping means supported by the enclosure for exerting clamping pressure endwise on the row of contact areas to clamp all of the overlapped pairs of contact areas together simultaneously.

2. A busway plug unit comprising: a sheet metal enclosure; a plurality of electric conductors within the enclosure having free ends of rectangular cross section disposed in side-by-side spaced relation; a base member detachably mounted on the enclosure, said base member including a plurality of spaced conducting elements extending from within to without the enclosure, said conducting elements having external ends disposed outside the enclosure for plug-in connection to bus bars of a busway and having internal ends of rectangular cross section interleaved with the free ends of said conductors inside the enclosure, said internal ends having areas respectively adapted for electrically contacting engagement with corresponding areas of predetermined corresponding free ends of said conductors; and clamping means supported by the enclosure for deflecting the free ends in a manner to establish firm contacting pressure at each of the respective areas of engagement between said predetermined free ends and the associated internal ends, said clamping means including a single force-applying means operable from outside the enclosure to apply and to release the contacting pressures at all of said areas of engagement.

3. A busway plug unit comprising: a sheet metal enclosure; a plurality of polyphase electric conductors in the enclosure having free ends of rectangular cross section disposed in side-by-side spaced relation; a base member detachably mounted on the enclosure, said base member including a plurality of spaced conducting elements extending from within to without the enclosure, said conducting elements having external ends outside the enclosure adapted to be respectively connected to bus bars of different phases of a polyphase busway and having internal ends of rectangular cross section located inside the enclosure, said internal ends each having an area disposed in overlapping electrically contacting engagement with an area of the free end of the correspondingly phased conductor; and clamping means supported by the enclosure comprising, a stack of individual insulators sandwiched among said free and internal ends to physically join and electrically separate the different phases with respect to each other and with respect to the structure of the clamping means, a plurality of tension members traversing all of the insulators, means securing the insulator at one end of the stack to the tension members, and adjustable force-applying means disposed adjacent the insulator at the opposite end of the stack for moving the last-mentioned insulator relative to the tension members in a direction to compress the stack and hence establish firm contacting pressure at each of the respective areas of engagement between said free ends and the associated internal ends.

4. A busway system comprising in combination: an elongated housing, a plurality of elongated generally parallel bus bars supported in insulated relation in said housing; a separate sheet metal body removably mounted on the housing; a plurality of electric conductors within the body having laterally movable portions of rectangular cross section disposed in side-by-side spaced relation; a base member detachably mounted on the body and disposed adjacent the housing, said base member including a plurality of spaced conducting elements each extending at one end in plug-in contact with a different one of the bus bars in the housing, the opposite end of each conducting element having an area disposed in overlapping electrically contacting engagement with a corresponding area of the laterally movable portion of a different one of said conductors; and clamping means supported by the body in cooperation with said conductors for deflecting said laterally movable portions in a manner to establish firm contacting pressure at each of the respective areas of engagement between the associated conductors and conducting elements, said clamping means including a single force-applying means operable to apply and to release the contacting pressures at all of said areas of engagement.

5. In combination: a unit housing a plurality of bus bars comprising a source of polyphase electric power; a separate sheet metal body removably mounted on said source unit; a plurality of polyphase electric conductors within the body having free ends disposed in side-by-side spaced relation; a base member detachably mounted on the body and disposed adjacent the source unit, said base member including a plurality of spaced conducting elements each extending at one end into plug-in contact with a bus bar of a different phase in the source unit, the opposite end of each conducting element having a flat area disposed in overlapping electrically contacting engagement with a flat area of the free end of the correspondingly phased one of said conductors; and clamping means supported by the body comprising a stack of individual insulators sandwiched among said free and opposite ends to physically join and electrically separate the different phases with respect to each other and with respect to the structure of the clamping means, a plurality of tension members traversing all of the insulators, means securing the insulator at one end of the stack to the tension members, and adjustable force-applying means disposed adjacent the insulator at the other end of the stack for moving the last-mentioned insulator relative to the tension members in a direction to compress the stack and hence establish firm contacting pressure at all of the respective areas of engagement between the free ends of said conductors and the associated opposite ends of said conducting elements.

6. In combination: a sheet metal unit enclosing a plurality of spaced-apart elongated bus bars and having an aperture for providing limited access to the enclosed bus bars; a separate sheet metal body removably mounted on the unit; a plurality of electric conductors within the body including laterally movable portions having flat areas disposed in parallel spaced relation; a base member detachably mounted on the body and disposed over the aperture of said unit, said base member including a plurality of spaced conducting elements entering said unit through said aperture for respectively engaging the bus bars, said conducting elements having internal ends interleaved among the laterally movable portions of said conductors within the body, the internal end of each conducting element having a flat area disposed in overlapping electrically contacting engagement with the flat area of the laterally movable portion of a different one of said conductors; and clamping means supported by the body in cooperation with said conductors for deflecting said laterally movable portions in a manner to establish firm contacting pressure at each of the respective areas of engagement between the associated conductors and conducting elements, said clamping means including a single force-applying means operable from outside said body to apply and to release the contacting pressures at all areas of engagement.

7. A busway plug unit comprising: a sheet metal enclosure; a plurality of polyphase electroconductive bars of rectangular cross section located within the enclosure, said bars being arranged to provide two bars per phase and extending in spaced-apart generally flatwise relationship to a terminal region wherein they are aligned in side-by-side parallel relationship; a base member detachably mounted on the enclosure, said base member including a plurality of spaced conducting elements extending from within to without the enclosure, said conducting elements having external ends outside the enclosure adapted to be respectively connected to bus bars of different phases of a polyphase busway and having internal ends of rectangular cross section located inside the enclosure, at least one side of each of said internal ends being adapted for electrically contacting engagement with a flat side of a correspondingly phased bar in said terminal region; and clamping means supported by the enclosure in cooperation with said bars in said terminal region for establishing firm contacting pressures between said engaging sides and between adjoining sides of bars associated with common phases, said clamping means including a single force-applying means for effecting all of said contacting pressures.

References Cited in the file of this patent

UNITED STATES PATENTS

| | | |
|---|---|---|
| 1,917,009 | Betts et al. | July 4, 1933 |
| 2,264,075 | Frank | Nov. 25, 1941 |
| 2,310,919 | Adam | Feb. 16, 1943 |
| 2,457,119 | Bour | Dec. 28, 1948 |
| 2,698,925 | Taylor | Jan. 4, 1955 |
| 2,725,541 | Born et al. | Nov. 29, 1955 |
| 2,748,364 | Kamm | May 29, 1956 |